United States Patent [19]

Ishizaka et al.

[11] Patent Number: 4,792,486
[45] Date of Patent: Dec. 20, 1988

[54] PERPENDICULAR MAGNETIC RECORDING MEDIUM

[75] Inventors: Yasuo Ishizaka; Noboru Watanabe; Kazuo Kimura, all of Yokohama; Eiichiro Imaoka, Sagamihara, all of Japan

[73] Assignee: Victor Company of Japan, Ltd., Yokchama, Japan

[21] Appl. No.: 176,832

[22] Filed: Apr. 4, 1988

Related U.S. Application Data

[63] Continuation of Ser. No. 842,470, Mar. 21, 1986, abandoned.

[30] Foreign Application Priority Data

Mar. 28, 1985 [JP] Japan .................................. 60-64629
Jul. 17, 1985 [JP] Japan ................................ 60-157906
Jul. 17, 1985 [JP] Japan ................................ 60-157907

[51] Int. Cl.$^4$ .............................................. G11B 5/66
[52] U.S. Cl. .................................... 428/336; 428/662; 428/664; 428/694; 428/900; 428/928; 428/611; 428/678; 428/668
[58] Field of Search ........................ 428/611, 678, 668

[56] References Cited

U.S. PATENT DOCUMENTS 4,550,062 10/1985 Takayama et al. ................. 428/611
4,576,700 3/1986 Kadokawa et al. ................. 428/694
4,603,091 7/1986 Mukasa ............................... 428/611

FOREIGN PATENT DOCUMENTS 0140513 5/1985 European Pat. Off. .
2842609 4/1979 Fed. Rep. of Germany .
3425178 1/1985 Fed. Rep. of Germany .
169331 10/1983 Japan .
59-65416 4/1984 Japan .
1297936 11/1972 United Kingdom .
2153391 8/1985 United Kingdom .

OTHER PUBLICATIONS

Gill et al, "The Growth Characteristics of Ion-Beam Sputtered CoCr Films on Ta Isolation Layers", IEEE Transactions on Magnetics, vol.-MAG-20, No. 5, Sep. 1984, p. 776.

"Initial Layer Effects in Co-Cr films", by Edward R. Wuori and Professor J. H. Judy, IEEE Transactions on Magnetics, vol. MAG-20, No. 5, Sep. 1984, pp. 774-775.

"VSM Profiling of CoCr Films: A New Analytical Technique", by William G. Haines, IEEE Transactions on Magnetics, vol. MAG-20, No. 5, Sep. 1984, pp. 814-814.

Primary Examiner—Ellis P. Robinson
Attorney, Agent, or Firm—Andrus, Sceales, Starke & Sawall

[57] ABSTRACT

A perpendicular magnetic recording medium comprises a recording medium base, a lower layer formed on the recording medium base, and an upper layer formed on the lower layer. The upper layer is made of cobalt-chromium, and the lower layer at least includes cobalt and chromium.

3 Claims, 13 Drawing Sheets

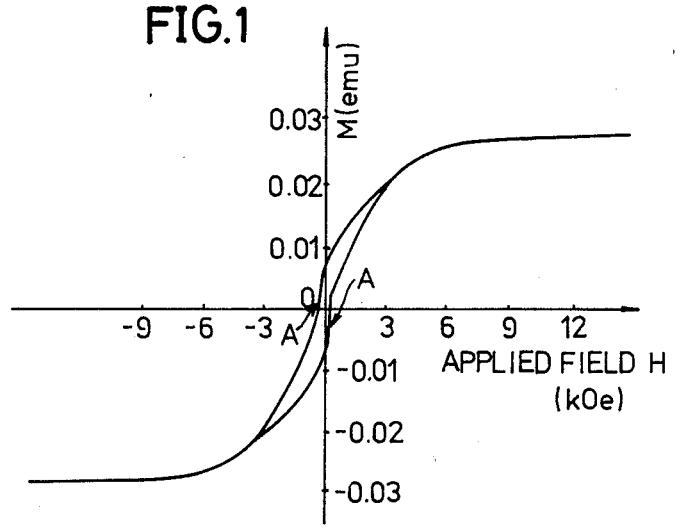
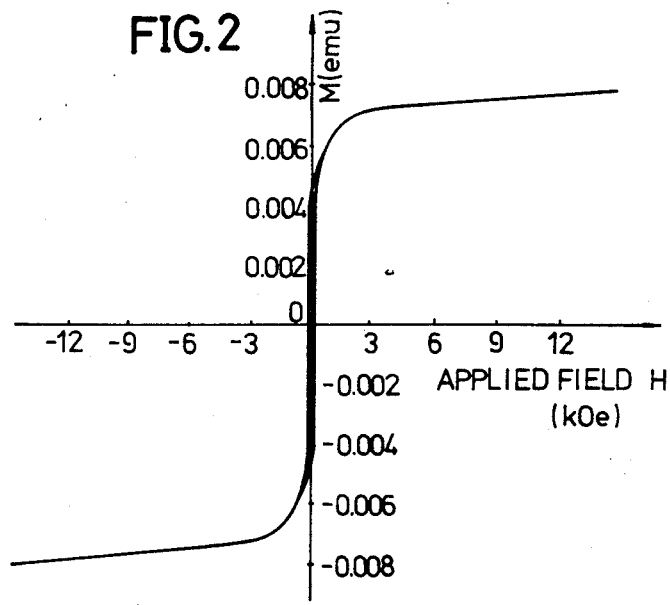

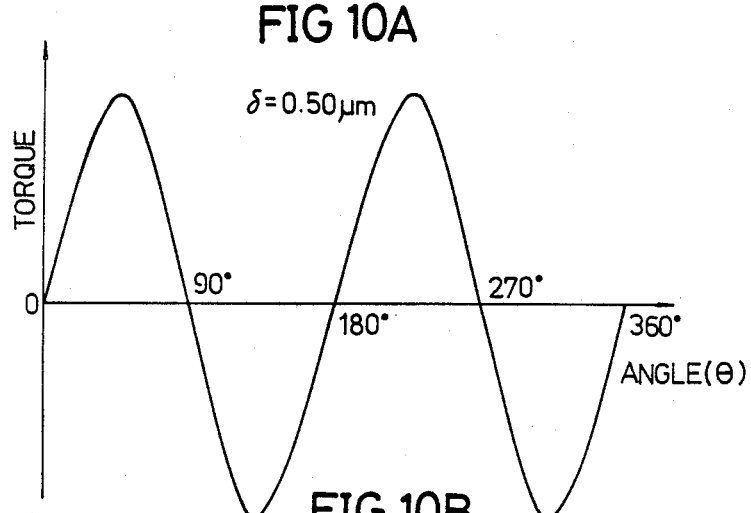
FIG 10A  $\delta = 0.50\mu m$
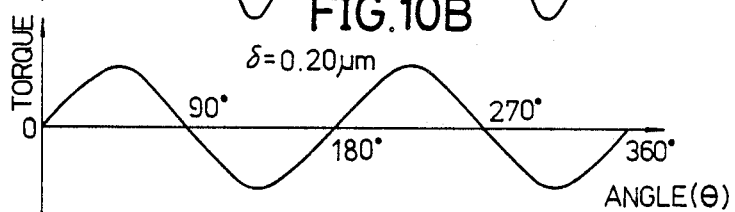
FIG. 10B  $\delta = 0.20\mu m$
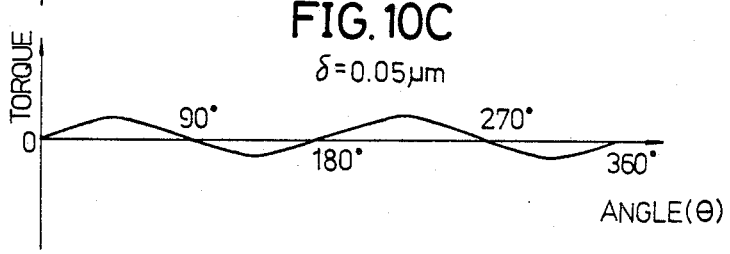
FIG. 10C  $\delta = 0.05\mu m$

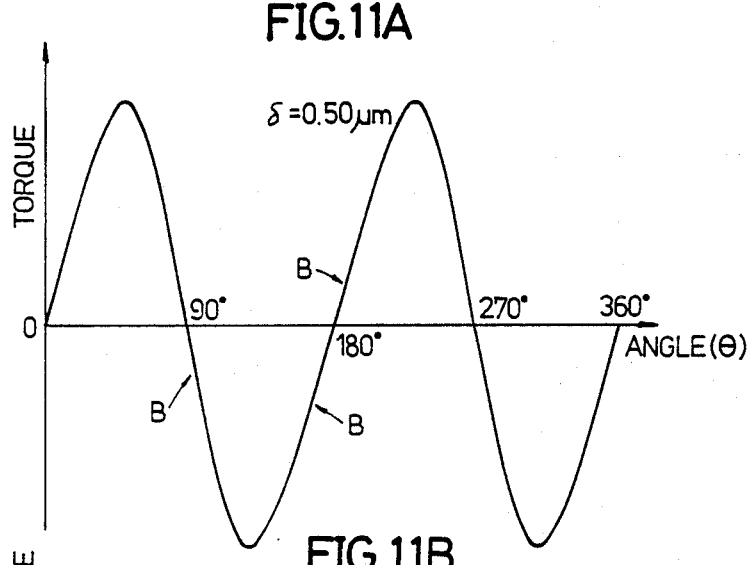
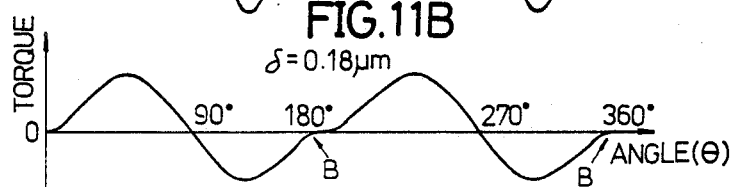
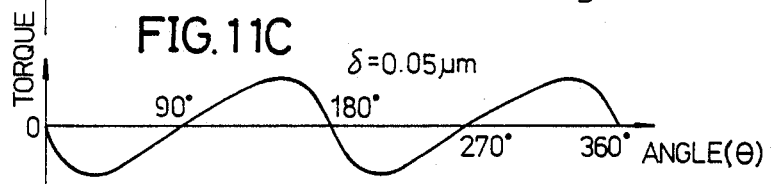
FIG.11A
FIG.11B
FIG.11C

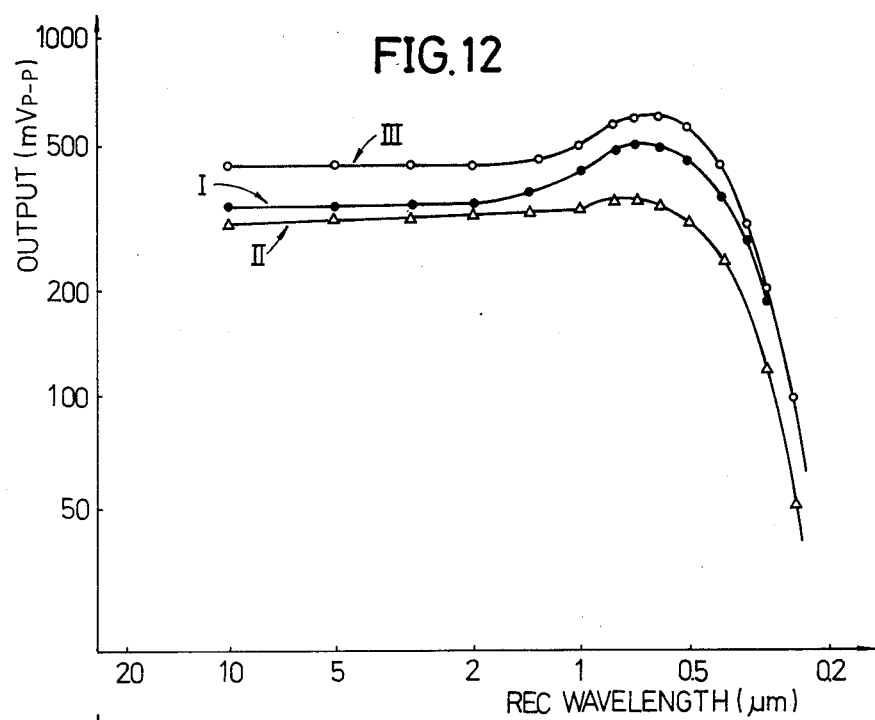
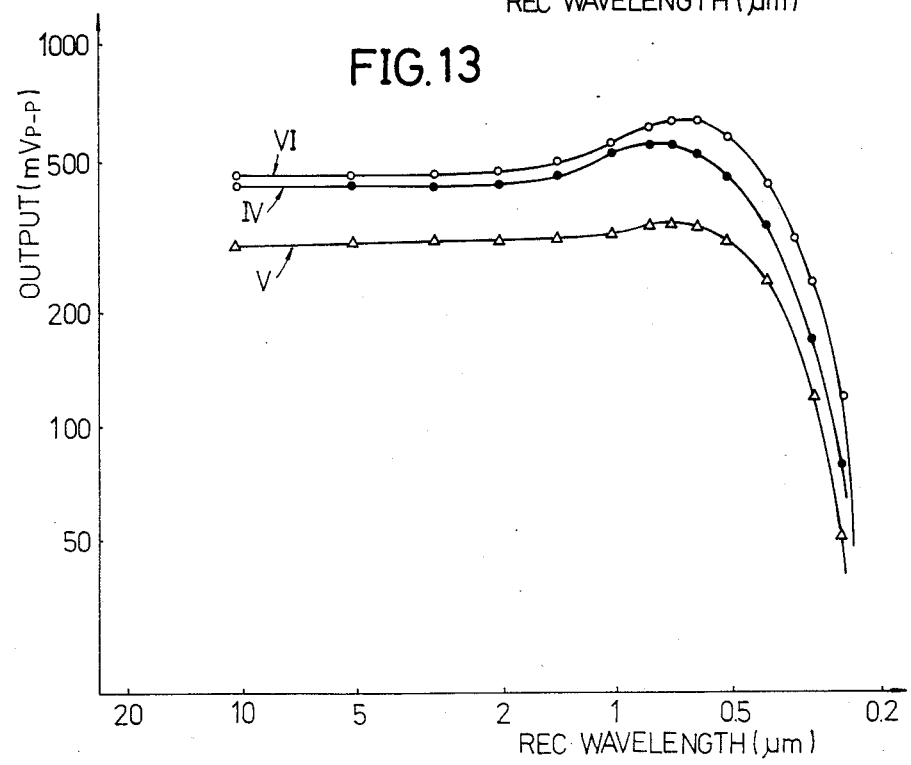

PERPENDICULAR MAGNETIC RECORDING MEDIUM

The present application is a continuation application of U.S. patent application Ser. No. 06/842,470 filed Mar. 21, 1986 and now abandoned.

BACKGROUND OF THE INVENTION

The present invention generally relates to perpendicular magnetic recording mediums, and more particularly to a perpendicular magnetic recording medium having satisfactory perpendicular magnetic recording and reproducing characteristics.

Generally, when recording and reproducing a signal on and from a magnetic recording medium by use of a magnetic head, the magnetic head magnetizes a magnetic layer of the magnetic recording medium in a longitudinal direction of the magnetic recording medium (that is, in an in-plane direction) at the time of the recording and picks up the recording at the time of the reproduction. However, according to such a longitudinal magnetic recording system, it is known that the demagnetization field becomes high as the recording density increases and the demagnetization field introduces undesirable effects to the high density magnetic recording. Hence, in order to eliminate the undesirable effects of the demagnetization, a perpendicular magnetic recording system has been proposed in which the magnetic head magnetizes the magnetic layer of the magnetic recording medium in a direction perpendicular to the magnetic layer. According to the perpendicular magnetic recording system, the demagnetization field becomes low as the magnetic recording density increases, and theoretically, it is possible to realize a satisfactory high density magnetic recording in which there is no decrease in the remanent magnetization.

As a conventional perpendicular magnetic recording medium which is used in the perpendicular magnetic recording system, there is a perpendicular magnetic recording medium having a cobalt-chromium (Co-Cr) film formed on a base film by a sputtering process. As is well known, the Co-Cr film is extremely suited for use in the perpendicular magnetic recording medium because the Co-Cr film has a relatively high saturation magnetization (Ms) and favors magnetization in a direction perpendicular to the Co-Cr film (that is, the coercivity in the direction perpendicular to the Co-Cr film is large and the axis of easy magnetization is perpendicular to the Co-Cr film).

However, due to the addition of chromium (Cr), cobalt (Co) has such an orientation that the axis of easy magnetization thereof is approximately perpendicular to the Co-Cr film but the axis of easy magnetization is not perfectly perpendicular, and it is impossible to obtain an extremely strong perpendicular anisotropic magnetic field with the perpendicular magnetic recording medium comprising the Co-Cr film. Hence, there is another perpendicular magnetic recording medium in which a third element is added to Co-Cr so that the axis of easy magnetization of Co is satisfactorily perpendicular to the film. For example, niobium (Nb) or tantalum (Ta) is added to Co-Cr as the third element. In this case, due to the addition of Nb or Ta, the orientation of Co is improved so that the axis of easy magnetization is satisfactorily perpendicular to the film but the saturation magnetization of the perpendicular magnetic recording medium decreases by the addition of Cr and Nb (or Ta) which are non-magnetic materials to Co which is a ferromagnetic material. As a result, there is a disadvantage in that it is impossible to obtain a high reproduced output due to the saturation magnetization.

Accordingly, a perpendicular magnetic recording medium having a double film construction has been proposed. According to this perpendicular magnetic recording medium, a film having a high permeability, that is, a film having a low coercivity such as a nickel-iron (Ni-Fe) film, is formed between the Co-Cr film and the base film. The magnetic flux which is spread within the high permeability film is concentrated toward the magnetic pole of the perpendicular magnetic head at a predetermined magnetic recording position in order to obtain a strong magnetization which is in the perpendicular direction and does not spread in the longitudinal direction of the perpendicular magnetic recording medium. However, in the case of the perpendicular magnetic recording medium having the double film construction, the coercivity of the high permeability film is extremely small compared to the coercivity of the Co-Cr film, and there is a disadvantage in that Barkhausen noise is generated. For example, the coercivity of the Co-Cr film is over 700 Oe, and the coercivity of the high permeability film is under 10 Oe. In order to prevent the generation of the Barkhausen noise, the high permeability film must have a coercivity which is at least over 10 Oe, but there is no suitable material which satisfies such a condition and can also be used for the high permeability film.

SUMMARY OF THE INVENTION

Accordingly, it is a general object of the present invention to provide a novel and useful perpendicular magnetic recording medium in which the disadvantages and problems are overcome, by noting the fact that when a magnetic material is coated on a base to form a magnetic layer the formed magnetic layer is constituted by two layers having different coercivities and utilizing for the perpendicular magnetic recording one of the two layers having a small coercivity.

Another and more specific object of the present invention is to provide a perpendicular magnetic recording medium comprising a base, a first layer formed on the base and at least including cobalt and chromium and a second layer formed on the first layer and consisting of cobalt and chromium. According to the perpendicular magnetic recording medium of the present invention, it is possible to obtain a high reproduced output, and a reproduced output versus recording wavelength characteristic is especially satisfactory in a short recording wavelength range. In addition, an in-plane magnetization (M-H) hysteresis loop of a magnetic layer as a whole rises sharply and anomalously in a vicinity of an origin and the so-called magnetization jump occurs. Thus, the perpendicular magnetic recording and reproducing characteristics can be improved by using as the magnetic layer the layer in which the magnetization jump occurs. In the present specification, a sudden change or steep inclination in the in-plane M-H hysteresis loop will be referred to as the magnetization jump, and a magnitude of the magnetization jump will be referred to as a magnetization jump quantity.

Other objects and further features of the present invention will be apparent from the following detailed description when read in conjunction with the accompanying drawings.

BRIEF DESCRIPTION OF THE DRAWINGS

FIG. 1 shows an in-plane M-H hysteresis loop for the case where a magnetic layer of an embodiment of the perpendicular magnetic recording medium according to the present invention is constituted by a cobalt-chromium-niobium (Co-Cr-Nb) thin film having a thickness of 0.2 micron and a magnetic field of 15 kOe is applied thereto;

FIG. 2 shows an in-plane M-H hysteresis loop for the case where the magnetic layer of the embodiment of the perpendicular magnetic recording medium according to the present invention is constituted by a Co-Cr-Nb thin film having a thickness of 0.05 micron and a magnetic field of 15 kOe is applied thereto;

FIGS. 10A through 10C are graphs respectively showing torque curves of the Co-Cr thin films respectively having film thicknesses of 0.50, 0.20 and 0.05 micron;

FIGS. 11A through 11C are graphs respectively showing torque curves of the Co-Cr-Nb thin films respectively having film thicknesses of 0.50, 0.18 and 0.05 micron;

FIG. 12 is a graph showing the relationships between the recording wavelength and the reproduced output when the perpendicular magnetic recording and reproduction are performed with respect to each of the recording mediums shown in Table 1 by use of a ring core head;

FIG. 13 is a graph showing the relationships between the recording wavelength and the reproduced output when the perpendicular magnetic recording and reproduction are performed with respect to each of the recording mediums shown in Table 2 by use of the ring core head;

DETAILED DESCRIPTION

Figure 3:
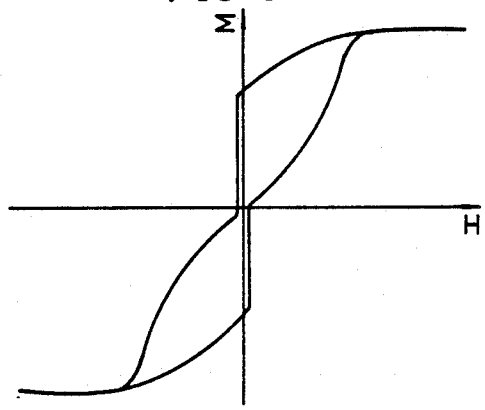
FIGS. 3 through 5 respectively show in-plane M-H hysteresis loops for explaining the reason why a magnetization jump occurs.

The perpendicular magnetic recording medium (hereinafter simply referred to as a recording medium) is made by sputtering on a substrate or a tape which becomes a base first and second magnetic materials which are used as targets. For example, the substrate or tape is made of a polyimide resin or the like, and the first magnetic material sputtered on the base contains cobalt (Co), chromium (Cr) and at least one of niobium (Nb) and tantalum (Ta). The second magnetic material sputtered on the layer of the first magnetic material consists of Co and Cr.

When a metal or the like such as an Co-Cr alloy is sputtered on the base, it is known that the sputtered film does not have the same crystal structure in a direction perpendicular to the film surface. It is known from various experiments and from scanning electron microscope (SEM) pictures that a first crystal layer of fine grain is formed in a vicinity of the base for an extremely small thickness, and a second crystal layer of coarse gain is formed on the first crystal layer. For example, the fact that the first crystal layer at the bottom portion of the sputtered film does not have a well defined columnar structure while the second crystal layer formed on the first crystal layer has a well defined columnar structure, is disclosed by Edward R. Wuori and Professor J. H. Judy, "Initial Layer effects in Co-Cr films", IEEE TRANSACTIONS ON MAGNETICS, Vol. MAG-20, No. 5, September 1984, pp. 774–775, and by William G. Haines, "VSM Profiling of CoCr Films: A New Analytical Technique", IEEE TRANSACTIONS ON MAGNETICS, Vol. MAG-20, No. 5, September 1984, pp. 812–814.

The present inventors noted on the above points, and sputtered on various metals which have a Co-Cr alloy as the base and are respectively added with a third element. Then, physical characteristics of the first crystal layer of fine grain formed on the bottom portion of the sputtered metal film and the second crystal layer of coarse grain formed on the first crystal layer were measured for each of the various sputtered metal films. As a result, it was found that when Nb or Ta is added to the metal as the third element, the perpendicular coercivity of the first crystal layer is extremely small compared to the perpendicular coercivity of the second crystal layer. The present invention is characterized in that this first crystal layer having the small perpendicular coercivity is used as an isotropic layer and a Co-Cr layer having a large saturation magnetization is formed on the first crystal layer and is used as a perpendicular magnetization layer of the recording medium.

Description will now be given with respect to the experimental results which were obtained by measuring the coercivities of the first and second crystal layers formed on the base by the sputtering. A Co-Cr-Nb thin film or a Co-Cr-Ta thin film is formed on the base by a sputtering process performed under the following conditions.

(1) Sputtering apparatus: RF magnetron sputtering apparatus.

(2) Sputtering method: Continuous sputtering, at an initial discharge pressure of $1 \times 10^{-6}$ Torr and introducing argon (Ar) gas until the pressure reaches $1 \times 10^{-3}$ Torr.

(3) Base: A polyimide resin having a thickness of 20 microns.
(4) Target: A composite target obtained by placing small pieces of Nb or Ta on the Co-Cr alloy.
(5) Distance between target and base: 110 mm.

The magnetic characteristic of the thin films was measured by a vibrating sample magnetometer manufactured by Riken Denshi of Japan, the composition of the thin films was measured by an energy dispersion type microanalyzer manufactured by KEVEX of the United States and the crystal orientation of the thin films was measured by an X-ray analyzer manufactured by Rigaku Denki of Japan.

FIG. 1 shows an in-plane M-H hysteresis loop for the case where a magnetic field of 15 kOe is applied to a recording medium which is obtained by adding Nb to Co-Cr as the third element (the same phenomenon occurs when the Nb is added in a range of 2 to 10 at%) and sputtering the Co-Cr-Nb on the polyimide resin base with a film thickness of 0.2 micron. As shown in FIG. 1, the in-plane M-H hysteresis loop rises sharply and anomalously in a vicinity of an origin as indicated by an arrow A and the so-called magnetization jump (hereinafter simply referred to as a jump) occurs. When it is assumed that a uniform crystal growth constantly occurs when the Co-Cr-Nb is sputtered on the base to form the Co-Cr-Nb thin film, the jump shown in FIG. 1 would not occur, and it can therefore be conjectured that a plurality of crystal layers having different magnetic characteristics coexist within the Co-Cr-Nb thin film.

FIG. 2 shows an in-plane M-H hysteresis loop for the case where a magnetic field of 15 kOe is applied to a recording medium which is obtained by sputtering the Co-Cr-Nb on the polyimide resin base with a film thickness of 0.05 micron under the same sputtering condition. Unlike the case shown in FIG. 1, there is no jump in the in-plane M-H hysteresis loop shown in FIG. 2, and it can be seen that the Co-Cr-Nb thin film having a film thickness in the order of 0.05 micron is constituted by a substantially uniform crystal layer. In addition, it can be seen from FIG. 2 that an in-plane coercivity $Hc(\parallel)$ (hereinafter simply referred to as a coercivity $Hc(\parallel)$) for the case where the film thickness is in the order of 0.05 micron is extremely small and the in-plane permeability is therefore extremely high. From these results, the coercivity $Hc(\parallel)$ of an initial layer which initially grows in the vicinity of the base by the sputtering is small, and this initial layer can be regarded as the first crystal layer of fine grain (hereinafter simply referred to as the first crystal layer) which has been confirmed by the SEM pictures as described before. A layer which grows on the initial layer has a coercivity $Hc(\parallel)$ which is larger than the coercivity $Hc(\parallel)$ of the initial layer, and this layer can be regarded as the second crystal layer of coarse grain (hereinafter simply referred to as the second crystal layer) which has also been confirmed by the SEM pictures.

Figure 4:
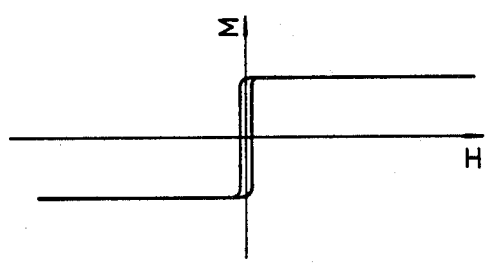
Figure 5:
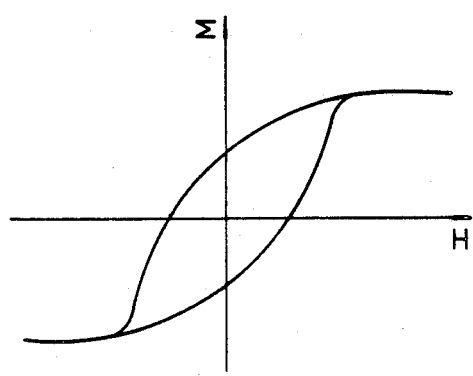

The reason why the jump occurs in the Co-Cr-Nb thin film in which the first and second crystal layers coexist will now be described in conjunction with FIGS. 3 through 5. It should be noted that the jump does not occur for all Co-Cr-Nb thin films with different compositions and sputtering conditions, as will be described later on in the specification. When the Co-Cr-Nb thin film is formed under a predetermined sputtering condition and the in-plane M-H hysteresis loop is obtained for this thin film by measurement, the obtained in-plane M-H hysteresis loop rises sharply in a vicinity of an origin as shown in FIG. 3, and the jump occurs. An in-plane M-H hysteresis loop shown in FIG. 4 for a thin film solely consisting of the first crystal layer can be obtained by measurement by forming a thin film which has a small film thickness. The second crystal layer can be regarded as having a uniform crystal structure, and further, the in-plane M-H hysteresis loop shown in FIG. 3 can be regarded as a composition of the in-plane M-H hysteresis loop of the first crystal layer and an in-plane M-H hysteresis loop of the second crystal layer. Hence, the in-plane M-H hysteresis loop of the second crystal layer can be regarded as a smooth hysteresis loop shown in FIG. 5 in which the coercivity $Hc(\parallel)$ is larger than that of the first crystal layer and no jump occurs. In other words, the existence of the jump in FIG. 3 indicates that two layers having different magnetic characteristics coexist in the same thin film. For this reason, it can be understood that two layers having different magnetic characteristics also coexist in the Co-Cr-Nb thin film having the in-plane M-H hysteresis loop shown in FIG. 1. The coercivity of the second crystal layer can be obtained from a hysteresis loop which is obtained by subtracting the in-plane M-H hysteresis loop of the Co-Cr-Nb thin film which solely consists of the first crystal layer from the in-plane M-H hysteresis loop of the Co-Cr-Nb thin film in which the first and second crystal layers coexist. From the experimental results, it is proved that two layers having different magnetic characteristics coexist in the Co-Cr-Nb thin film when the in-plane M-H hysteresis loop of the Co-Cr-Nb thin film has a sharp rise in the vicinity of the origin and the jump occurs.

Figure 6:
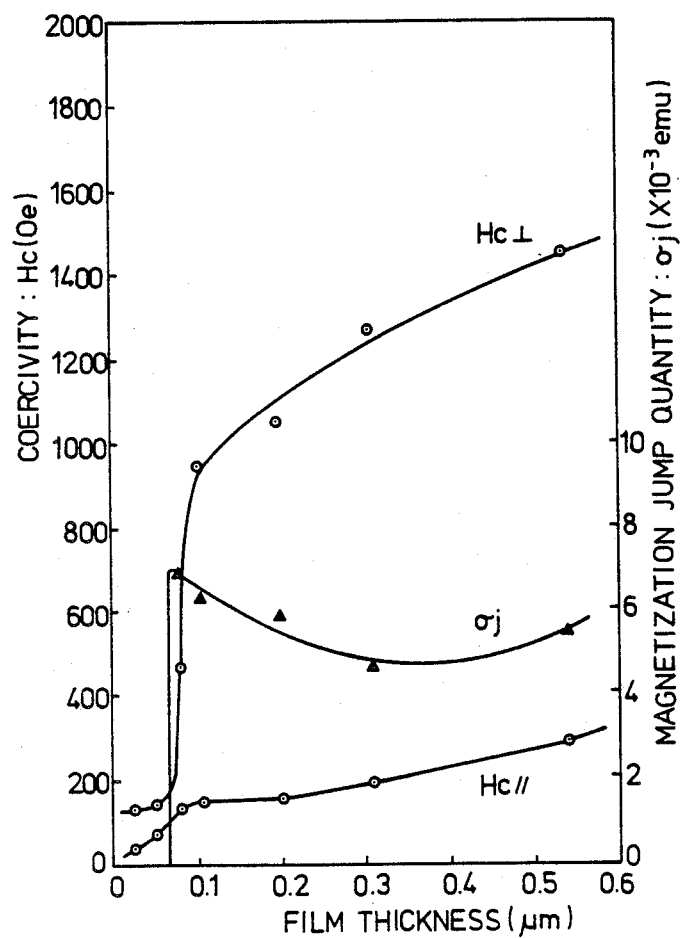
FIG. 6 is a graph showing an in-plane coercivity Hc($\parallel$), a perpendicular coercivity Hc($\perp$) and a magnetization jump quantity $\sigma_j$ for each film thickness when the film thickness of the Co-Cr-Nb thin film is controlled by varying the sputtering time.

Next, description will be given with respect to the magnetic characteristics of the two layers constituting the Co-Cr-Nb thin film which is sputtered on the base in relation to the film thickness of the Co-Cr-Nb thin film, by referring to FIG. 6. FIG. 6 is a graph showing the coercivity $Hc(\parallel)$, a perpendicular coercivity $Hc(\perp)$ (hereinafter simply referred to as a coercivity $Hc(\parallel)$) and a magnetization jump quantity (hereinafter simply referred to as a jump quantity) $\Sigma_j$ for each film thickness when the film thickness of the Co-Cr-Nb thin film is controlled by varying the sputtering time.

Giving attention to the coercivity $Hc(\parallel)$, the coercivity $Hc(\parallel)$ is under 180 Oe and is extremely small when the film thickness is under 0.15 micron, and the in-plane permeability can be regarded as being high. Further, a difference in the values of the coercivities $Hc(\perp)$ and $Hc(\parallel)$ in a vicinity of the film thickness at which the jump occurs is relatively small, and it can be said that the Co-Cr-Nb thin film is an isotropic layer. In addition, the coercivity $Hc(\parallel)$ does not change greatly even when the film thickness increases. On the other hand, giving attention to the jump quantity $\sigma_j$, the jump quantity $\sigma_j$ rises sharply at the film thickness of approximately 0.075 micron and describes an upwardly-opening parabola for the thickness of over 0.075 micron. Further, giving attention to the coercivity $Hc(\perp)$, the coercivity $Hc(\perp)$ rises sharply from approximately 180 Oe at the film thickness of 0.05 to 0.15 micron and is over 900 Oe for the film thickness of over 0.15 micron. From these results, it can be seen that a boundary between the first and second crystal layers exists at the film thickness of approximately 0.05 to 0.15 micron. The coercivities $Hc(\parallel)$ and $Hc(\perp)$ of the first crystal layer are both under 180 Oe and small, and the first crystal layer is an isotropic layer in which the difference between the coercivities Hc($\parallel$) and Hc($\perp$) is small. At such a film thickness that the jump does not occur, the coercivities Hc($\parallel$) and Hc($\perp$) are both under 180 Oe and small. But at such a large film thickness that the jump occurs, the coercivity Hc($\perp$) sharply increases. It is hence also seen from this point of view that the Co-Cr-Nb thin film is constituted by two layers having different magnetic characteristics when the jump occurs. According to the experiments performed by the present inventors, when the composition and/or the sputtering condition is slightly changed, there is a slight change in the film thickness at which the jump quantity $\sigma_j$ and the coercivity Hc($\perp$) respectively rise sharply, and the slight change in the film thickness occurs within the range of 0.05 to 0.15 micron. In addition, there are slight changes in the coercivities Hc($\parallel$) and Hc($\perp$) when the above conditions are changed, and the value of the coercivity Hc($\parallel$) changes in the range of approximately 10 to 220 Oe. That is, it can be regarded that the jump occurs when the first crystal layer has a thickness in the range of 0.05 to 0.15 micron and the coercivity Hc($\parallel$) is in the range of approximately 10 to 220 Oe.

Figure 7:
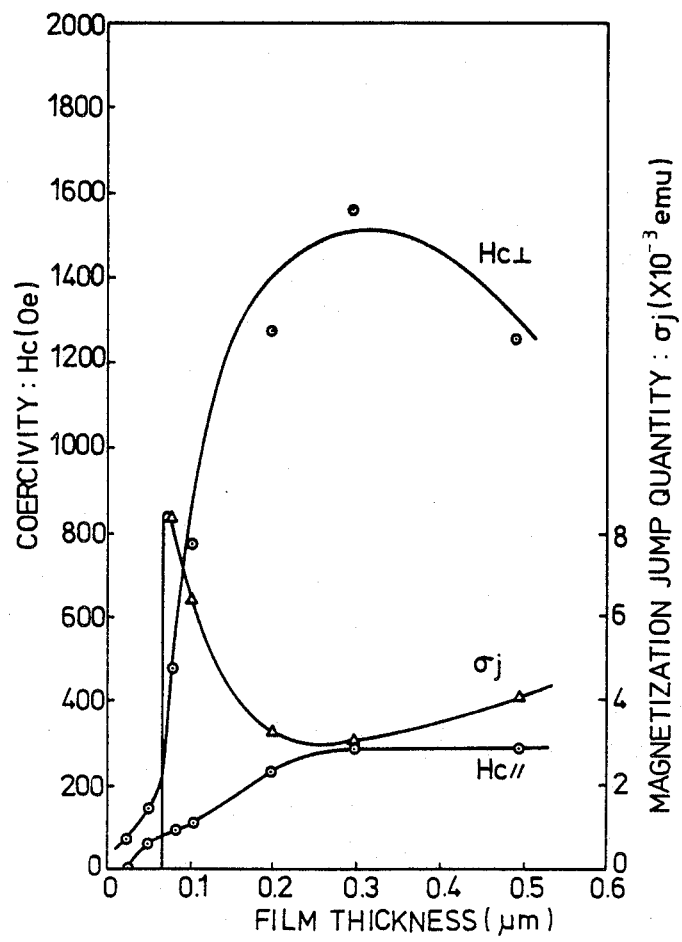
FIG. 7 is a graph showing an in-plane coercivity Hc($\parallel$), a perpendicular coercivity Hc($\perp$) and a magnetization jump quantity $\sigma_j$ for each film thickness when the film thickness of a cobalt-chromium-tantalum (Co-Cr-Ta) thin film is controlled by varying the sputtering time.

Next, the results shown in FIG. 7 are obtained when similar experiments are performed by adding Ta to Co-Cr as the third element (the same phenomenon occurs when the Ta is added in a range of 1 to 10 at%) and sputtering the Co-Cr-Ta on the polyimide resin base with various film thicknesses. FIG. 7 is a graph showing the coercivity Hc($\parallel$), the perpendicular coercivity Hc($\perp$) and the jump quantity $\sigma_j$ for each film thickness when the film thickness of the Co-Cr-Ta thin film is controlled by varying the sputtering time. The results obtained by adding the Ta to the Co-Cr are similar to the case where the Nb is added to the Co-Cr. As shown in FIG. 7, the boundary between the first and second crystal layers exists at the film thickness of 0.05 to 0.15 micron. The coercivities Hc($\parallel$) and Hc($\perp$) of the first crystal layer are both under 170 Oe and small, and the first crystal layer is an isotropic layer in which the difference between the coercivities Hc($\parallel$) and Hc($\perp$) is small.

Figure 8A:
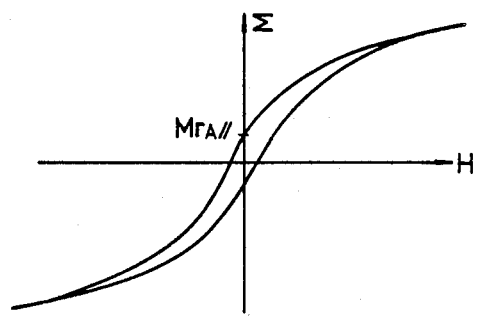
FIGS. 8A through 8C are graphs respectively showing an in-plane M-H hysteresis loop of the Co-Cr-Nb thin film in which no magnetization jump occurs.
Figure 8B:
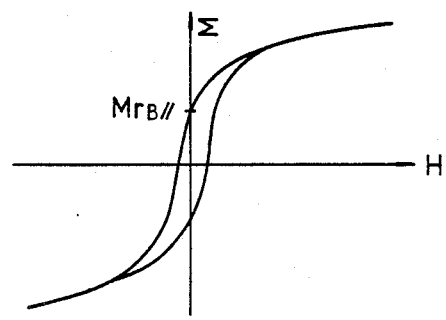
Figure 8C:
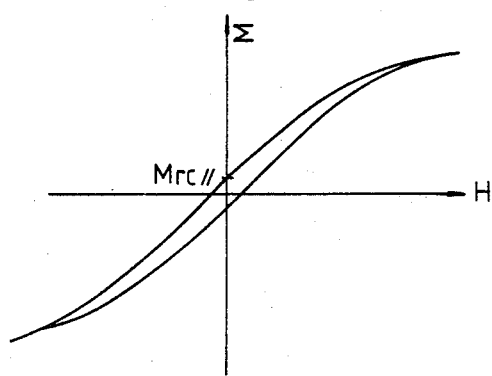

It should be noted from the experiments described above that the jump does not occur when the sputtering condition and the adding quantity of the Nb or Ta (2 to 10 at% in the case of the Nb and 1 to 10 at% in the case of the Ta) are changed from those described before, however, the first and second crystal layers are also formed within the Co-Cr-Nb thin film and the Co-Cr-Ta thin film in which no jump occurs (refer to the references cited on page 8). An example of the in-plane M-H hysteresis loop of the Co-Cr-Nb thin film in which no jump occurs will be described by referring to FIGS. 8A through 8C. FIG. 8A shows the in-plane M-H hysteresis loop for both the first and second crystal layers, FIG. 8B shows the in-plane M-H hysteresis loop solely for the first crystal layer and FIG. 8C shows the in-plane M-H hysteresis loop solely for the second crystal layer. It is seen from FIGS. 8A through 8C that the in-plane remanent magnetization $Mr_B(\parallel)$ of the first crystal layer is larger than the in-plane remanent magnetization $Mr_C$ of the second crystal layer. Further, the in-plane remanent magnetization $Mr_A(\parallel)$ of both the first and second crystal layers is unfavorable compared to the in-plane remanent magnetization $Mr_C(\parallel)$ of the second crystal layer, and the anisotropic magnetic field Mk is small. In addition, it is known that the orientation of the first crystal layer is poor (the $\Delta\theta_{50}$ is large) and the first crystal layer is unsuited for the perpendicular magnetic recording.

Figure 9:
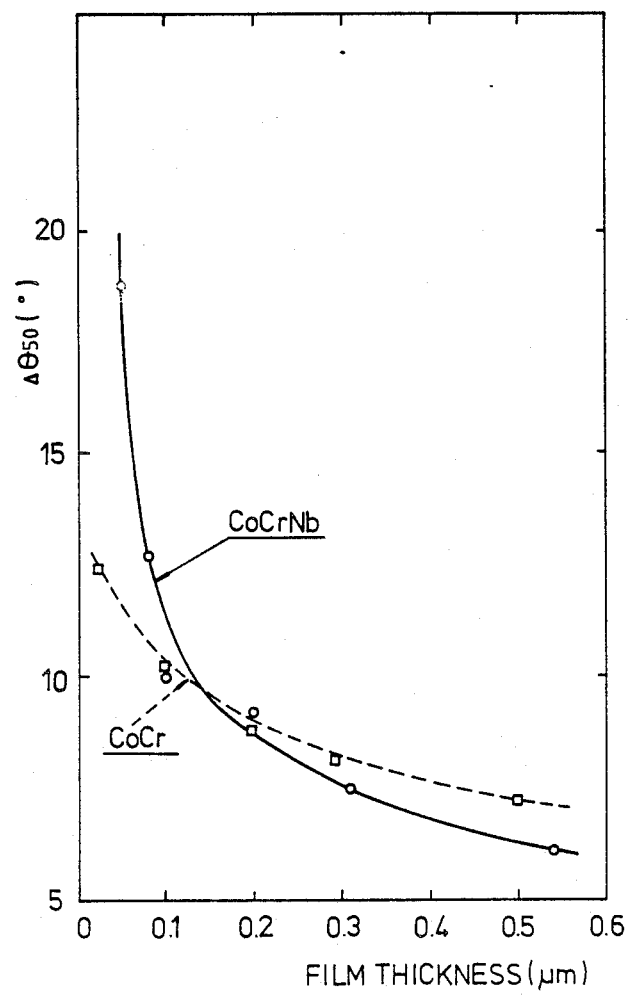
FIG. 9 is a graph showing the relationships of the rocking curve half-value ($\Delta\theta_{50}$) of the hcp (002) plane of each of a cobalt-chromium (Co-Cr) thin film and the Co-Cr-Nb thin film with respect to the film thickness.

FIG. 9 is a graph showing the relationships of the rocking curve half-value ($\Delta\theta_{50}$) of the hcp (002) plane of each of a cobalt-chromium (Co-Cr) thin film (composition of $Co_{81}Cr_{19}$ at%) and the Co-Cr-Nb thin film with respect to the film thickness. The Co-Cr thin film is formed under the same sputtering conditions as those described before except for the condition (4), and the Co-Cr alloy alone is used as the target in this case. It is seen from FIG. 9 that the orientation of the Co-Cr-Nb thin film is extremely poor in the initial stage of the film formation while the orientation of the Co-Cr thin film is satisfactory in the initial stage of the film formation. However, the orientation of the Co-Cr-Nb thin film improves rapidly as the film thickness of the thin film increases. The orientation of the Co-Cr-Nb thin film is more satisfactory than that of the Co-Cr thin film when the film thickness of the Co-Cr-Nb thin film is over approximately 0.15 micron. In other words, the orientation of the Co-Cr-Nb thin film is poor in the initial stage of the film formation, that is, during the formation of the first crystal layer, but the orientation of the Co-Cr-Nb thin film rapidly improves when the film thickness becomes over approximately 0.15 micron, that is, when the second crystal layer is formed. hence, it can be understood that in the case of the Co-Cr-Nb thin film, two layers having different magnetic characteristics are formed depending on the film thickness, and the orientation of the second crystal layer is more satisfactory than that of the Co-Cr thin film.

Next, the Co-Cr-Nb thin film will be examined from the point of view of the magnetic anisotropy. FIGS. 10A through 10C are graphs respectively showing torque curves of the Co-Cr thin films respectively having film thicknesses of 0.50, 0.20 and 0.05 micron, and FIGS. 11A through 11C are graphs respectively showing torque curves of the Co-Cr-Nb thin films respectively having film thicknesses of 0.50, 0.18 and 0.05 micron. In each of these graphs, the abscissa ($\theta$) represents the angle formed between the normal to the film surface and the applied magnetic field, the ordinate represents the torque, and the applied magnetic field to the thin film is 10 kOe. Moreover, the Co-Cr thin films and the Co-Cr-Nb thin films respectively have the composition of $Co_{81}Cr_{19}$ at% and $Co_{77.9}Cr_{16.0}Nb_{6.1}$ at% and the saturation magnetization Ms of 400 emu/cc and 350 emu/cc.

In the case of the Co-Cr thin films shown in FIGS. 10A through 10C, the polarity of the torque curve is the same for the three thin films and the axis of easy magnetization is perpendicular to the film surface. In the case of the Co-Cr-Nb thin films shown in FIGS. 11A and 11B respectively having the film thicknesses of 0.50 and 0.18 micron, the polarity of the torque curve is the same for the two thin films and the axis of easy magnetization is perpendicular to the film surface. However, in the case of the Co-Cr-Nb thin film shown in FIG. 11C having the film thickness of 0.05 micron, the polarity of the torque curve is opposite to that of the torque curves of the other thin films and the axis of easy magnetization is in-plane of the thin film. As described before, it can be regarded that only the first crystal layer is formed in the case of the Co-Cr-Nb thin film having the film thickness of 0.05 micron, and the axis of easy magnetization of the first crystal layer is in-plane of the first crystal layer. As the film thickness increases, the axis of easy magnetization becomes perpendicular to the film surface, and it can be regarded that the second crystal layer has a strong axis of easy magnetization which is perpendicular to the film surface. Further, it should be noted that in the torque curves of the Co-Cr-Nb thin films having the films thicknesses of over 0.05 micron, there are anomalous parts indicated by arrows B in FIGS. 11A and 11B. It can be regarded that the anomalous part in the torque curve is introduced due to the magnetic characteristic of the first crystal layer. In other words, when the film thickness of the thin film becomes larger than a predetermined value, the second crystal layer which has an axis of easy magnetization perpendicular to the film surface is formed on the first crystal layer which has an axis of easy magnetization in-plane of the first crystal layer. It can be conjectured that the first and second crystal layers having the different magnetic characteristics affect each other and the anomalous part is introduced in the torque curve of the thin film as a whole. It is hence also proved from the torque curves that two layers having different magnetic characteristics coexist in the single Co-Cr-Nb thin film.

When the Co-Cr-Nb or Co-Cr-Ta thin film constituted by the first and second crystal layers is used as the magnetic layer of the perpendicular magnetic recording medium and an attempt is made to magnetize the entire thin film in the direction perpendicular to the film surface according to the conventional concept, the existence of the first crystal layer is an extremely unfavorable primary factor to the perpendicular magnetization. The existence of the first crystal layer is an unfavorable primary factor for both cases where the jump does and does not occur. In other words, in the case where the jump occurs, the coercivities $Hc(\parallel)$ and $Hc(\perp)$ of the first crystal layer is extremely small and it can be regarded that there is virtually no perpendicular magnetization in the first crystal layer. On the other hand, in the case where the jump does not occur, the coercivity $Hc(\parallel)$ of the first crystal layer is larger than that of the case where the jump occurs, but the coercivity $Hc(\perp)$ of the first crystal layer is insufficient for realizing the perpendicular magnetic recording, and it can be regarded that it is impossible to perform a satisfactory perpendicular magnetic recording. Accordingly, even when the magnetization is performed in the direction perpendicular to the film surface, there is virtually no perpendicular magnetization in the first crystal layer, and the efficiency of the perpendicular magnetization of the thin film as a whole is deteriorated. Such a deterioration in the efficiency of the perpendicular magnetization is especially notable in the case of a magnetic head such as the ring core head which generates a magnetic field including considerable components in the in-plane direction.

However, the first crystal layer of the recording medium according to the present invention has such a characteristic that the coercivity $Hc(\parallel)$ is small, that is, the first crystal layer has a relatively high permeability and an isotropic magnetic characteristic. The characteristic of the first crystal layer is thus similar to the high permeability layer of the conventional recording medium provided between the Co-Cr film and the base. It can thus be regarded that in the Co-Cr-Nb or Co-Cr-Ta thin film, the first crystal layer having the low coercivity $He(\parallel)$ is usable as the high permeability layer of the recording medium.

Accordingly, it is possible to consider utilizing the first crystal layer as the high permeability layer when sputtering the single layer of the Co-Cr-Nb or Co-Cr-Ta thin film and utilizing the second crystal layer as the perpendicular magnetization layer. However, in the single layer of the Co-Cr-Nb or Co-Cr-Ta thin film, the quantity of Nb or Ta added to Co-Cr becomes limited to a predetermined quantity with which the jump occurs. In addition, when Nb or Ta which is a non-magnetic material is added to Co which is a ferromagnetic material, the saturation magnetization Ms becomes small compared to that of the Co-Cr thin film, and it is impossible to perform perpendicular magnetic recording and reproduction so that a high reproduced output is obtainable.

By taking the above points into consideration, the recording medium according to the present invention is formed as follows. That is, a crystal layer of fine grain of a Co-Cr-Nb or Co-Cr-Ta thin film is formed on a base under the conditions with which the jump described before occurs. Then, a crystal layer of coarse grain of a Co-Cr thin film having a high saturation magnetization Ms is sputtered on the crystal layer of the Co-Cr-Nb or Co-Cr-Ta thin film, and this crystal layer of coarse grain is used as a layer which contributes to the perpendicular magnetic recording and reproduction. In the Co-Cr thin film, the adding quantity of Cr to Co is approximately 5 to 20 at%. Table 1 shows various magnetic characteristics of a single film recording medium I comprising a single thin film of Co-Cr-Nb in which the jump occurs, a single film recording medium II comprising a single thin film of Co-Cr and a double film recording medium III having the construction described above wherein the Co-Cr-Nb thin film is used as the crystal layer of fine grain. The double film recording medium III comprises the crystal layer of fine grain (lower layer) of Co-Cr-Nb formed on the base under the conditions with which the jump occurs, and the crystal layer of coarse grain (upper layer) of Co-Cr formed on the lower layer. The relationships between the recording wavelength and the reproduced output when the perpendicular magnetic recording and reproduction are performed with respect to each of the recording mediums shown in Table 1 by use of a ring core head are shown in FIG. 12. Table 2 showed various magnetic characteristics of a single film recording medium IV comprising a single thin film of Co-Cr-Ta in which the jump occurs, a single film recording medium V comprising a single thin film of Co-Cr and a double film recording medium VI having the construction described above wherein the Co-Cr-Ta thin film is used as the crystal layer of fine grain. The double film recording medium VI comprises the crystal layer of fine grain (lower layer) of Co-Cr-Ta formed on the base under the conditions with which the jump occurs, and the crystal layer of coarse grain (upper layer) of Co-Cr formed on the lower layer. The relationships between the recording wavelength and the reproduced output when the perpendicular magnetic recording and reproduction are performed with respect to each of the recording mediums shown in Table 2 by use of a ring core head are shown in FIG. 13. In Tables 1 and 2, U and L respectively represent upper and lower layers of the double film recording medium, $\delta$ represents the film thickness, Ms represents the saturation magnetization, $Hc(\perp)$ represents the perpendicular coercivity, $Hc(\parallel)$ represents the in-plane coercivity, $Mr(\parallel)/Ms$ represents the in-plane squareness ratio, $Mr(\parallel)$ represents the in-plane remanent magnetization and $\Delta\theta_{50}$ represents the rocking half-value of the hcp (002) plane. The magnetic properties in rows III and VI are for the double film recording medium. In FIGS. 12 and 13, the same designations used in Tables 1 and 2 are used to indicate the respective reproduced output versus recording wavelength characteristics of the recording mediums I through VI film recording medium III is greater than the jump quantity of the single film recording medium I having the in-plane M-H hysteresis loop shown in FIG. 1. Similarly, the jump quantity of the double film recording medium VI is greater than the jump quantity of the

TABLE 1

| | Composition (at %) | $\delta$ ($\mu$m) | Ms (emu/cc) | Hc($\perp$) (Oe) | Hc(//) (Oe) | $\frac{Mr(//)}{Ms}$ | $\Delta\theta 50$ (deg) |
|---|---|---|---|---|---|---|---|
| I | $Co_{84.1}Cr_{13.2}Nb_{2.7}$ | 0.19 | 448 | 893 | 177 | 0.24 | 8.7 |
| II | $Co_{83.2}Cr_{16.8}$ | 0.18 | 640 | 792 | 420 | 0.24 | 10.1 |
| III | U $Co_{83.2}Cr_{16.8}$ | 0.10 | 549 | 906 | 205 | 0.25 | 8.4 |
| | L $Co_{84.1}Cr_{13.2}Nb_{2.7}$ | 0.11 | | | | | — |

TABLE 2

| | Composition (at %) | $\delta$ ($\mu$m) | Ms (emu/cc) | Hc($\perp$) (Oe) | Hc(//) (Oe) | $\frac{Mr(//)}{Ms}$ | $\Delta\theta 50$ (deg) |
|---|---|---|---|---|---|---|---|
| IV | $Co_{84.8}Cr_{13.4}Ta_{1.8}$ | 0.20 | 464 | 1275 | 231 | 0.23 | 8.4 |
| V | $Co_{83.2}Cr_{16.8}$ | 0.18 | 640 | 792 | 420 | 0.24 | 10.1 |
| VI | U $Co_{83.2}Cr_{16.8}$ | 0.09 | 489 | 1016 | 146 | 0.28 | 8.4 |
| | L $Co_{84.8}Cr_{13.4}Ta_{1.8}$ | 0.11 | | | | | — |

As may be seen from Table 1, the saturation magnetization Ms of the double film recording medium III is greater than the saturation magnetization Ms of the single film recording medium I comprising the Co-Cr-Nb thin film in which the jump occurs. Similarly, the saturation magnetization Ms of the double film recording medium VI is greater than the saturation magnetization Ms of the single film recording medium IV comprising the Co-Cr-Ta thin film in which the jump occurs. In addition, the coercivities Hc($\perp$) of the double film recording mediums III and VI are sufficiently high, and the magnetic characteristics of the double film recording mediums III and VI are suited for the perpendicular magnetic recording and reproduction.

According to the experiments performed by the present inventors, the in-plane squreness ratios Mr($\|$)/Ms of the double film recording mediums formed under the predetermined conditions described before had a value equal to or greater than a minimum value of 0.25.

On the other hand, as may be seen from the reproduced output versus recording wavelength characteristics shown in FIG. 12, the reproduced output obtained with the double film recording medium III is higher than the reproduced outputs obtained with the single film recording mediums I and II for the entire recording wavelength range. Especially in the short recording wavelength range of 1 to 0.2 micron, the reproduced outputs obtained with the single film recording mediums I and II increase, but the reproduced output obtained with the double film recording medium III increases with a much greater rate. Accordingly, it can be seen that the double film recording medium III is especially suited for the perpendicular magnetic recording and reproduction in the short recording wavelength range.

Results similar to those shown in FIG. 12 were also obtained with the double film recording medium VI as shown in FIG. 13.

Figure 14:
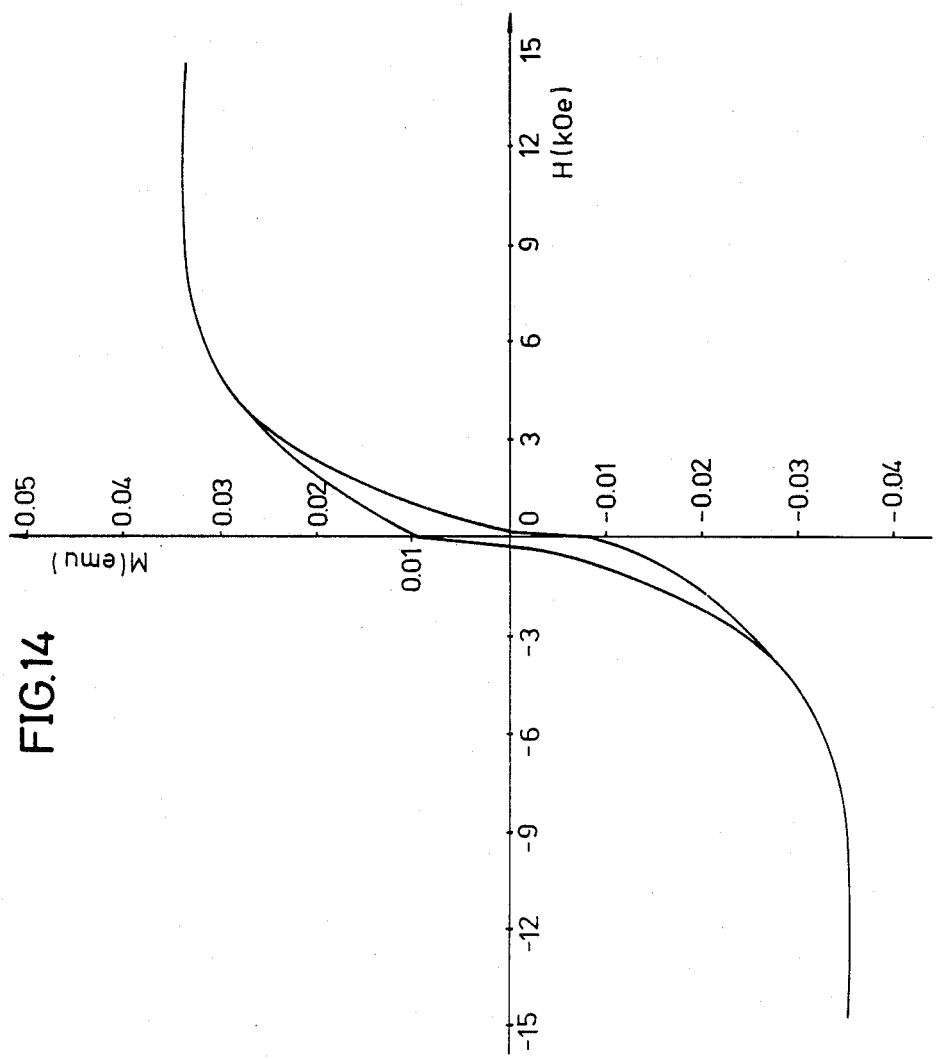
FIG. 14 is a graph showing an in-plane M-H hysteresis loop of a double film recording medium shown in Table 1.
Figure 15:
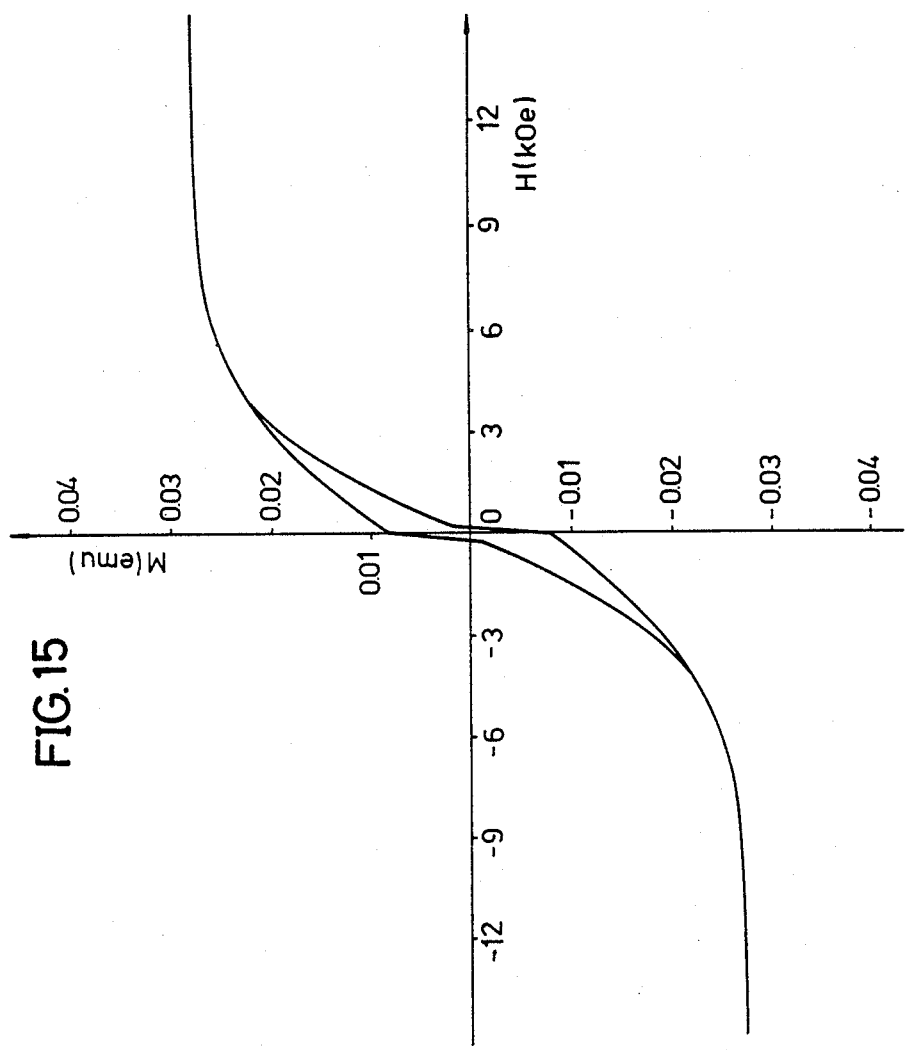
FIG. 15 is a graph showing an in-plane M-H hysteresis loop of a double film recording medium shown in Table 2.

FIGS. 14 and 15 respectively show the in-plane M-H hysteresis loops of the double film recording mediums III and VI shown in Tables 1 and 2 for the case where a magnetic field of 15 kOe is applied to the double film recording mediums III and VI. As may be seen from FIGS. 14 and 15, the in-plane M-H hysteresis loops of the double film recording mediums III and VI respectively have a steep rise in a vicinity of an origin and the so-called jump occurs. The jump quantity of the double single film recording medium IV. In other words, the in-plane M-H hysteresis loops of the double film recording mediums III and VI respectively have a steep rise in the vicinity of the origin compared to the in-plane M-H hysteresis loops of the other single film recording mediums, and as may be seen from FIGS. 12 and 13, the perpendicular magnetic recording and reproducing characteristics of these recording mediums III and VI are highly efficient compared to those of the single film recording mediums.

Figure 16:
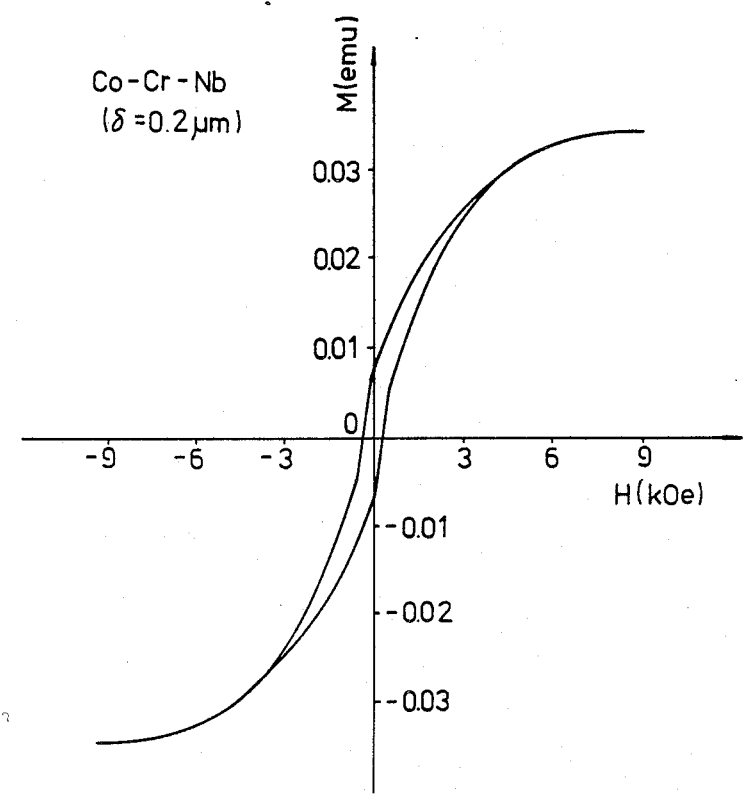
FIG. 16 is a graph showing an in-plane M-H hysteresis loop of a double film recording medium shown in Table 3.

As described before, the magnetic characteristic of the crystal layer of fine grain formed on the base is slightly changed by changing the composition and the sputtering conditions. Particularly, the value of the coercivity Hc($\|$) changes in the range of approximately 10 to 220 Oe. For example, in one of the experiments performed by the present inventors, the coercivity Hc($\|$) of the crystal layer of fine grain of the double film recording medium is 248 Oe, the Co-Cr thin film is formed on this crystal layer of ine grain and the in-plane M-H hysteresis loop of this double film recording medium having the magnetic characteristics shown in Table 3 became as shown in FIG. 16. In Table 3, the designations used in Tables 1 and 2 are used. As may be seen from FIG. 16, there are cases where the jump occurs even when the coercivity Hc($\|$) is greater than 220 Oe, but taking into account the experimenting conditions such as a measuring error and the like, it can be regarded that the upper limit value of the coercivity Hc($\|$) with which the jump occurs is in the range of 220 Oe.

TABLE 3

| Composition (at %) | $\delta$ ($\mu$m) | Ms (emu/cc) | $\frac{Mr(//)}{Ms}$ | Hc(//) (Oe) |
|---|---|---|---|---|
| U $Co_{83.2}Cr_{16.8}$ | 0.12 | 569 | 0.21 | 248 |
| L $Co_{84.1}Cr_{13.2}Nb_{2.7}$ | 0.08 | | | |

Figure 17:
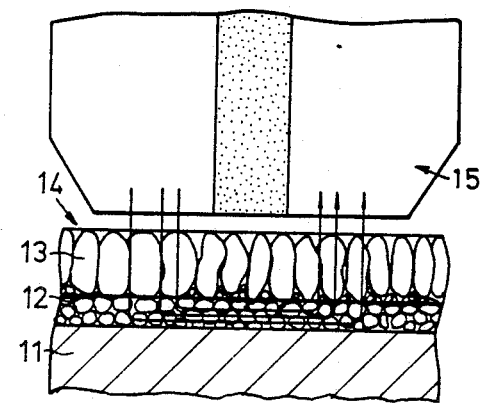
FIG. 17 is a diagram for explaining a magnetic loop formed within the double film recording medium by a magnetic flux of the ring core head.

The reasons why the phenomenon described before occur will now be described in conjunction with FIG. 17. When Co-Cr-Nb or Co-Cr-Ta (hereinafer simply referred to as Co-Cr-Nb(Ta)) is sputtered on a base 11 made of polyimide resin or the like to a film thickness of approximately 0.1 micron, it can be regarded that a crystal layer 12 of fine grain is formed throughout approximately the entire Co-Cr-Nb(Ta) thin film. The coercivity Hc(∥) of this crystal layer 12 including Co-Cr and Nb (or Ta) added thereto is small. Furthermore, a difference between the coercivities Hc(∥) and Hc(⊥) of this crystal layer 12 is small. In other words, the crystal layer 12 is an isotropic layer. For this reason, it is possible to utilize the crystal layer 12 as the so-called high permeability layer of the recording medium so that the crystal layer 12 functions similarly to the high permeability layer.

Co-Cr is sputtered on the crystal layer 12 to a film thickness of approximately 0.1 micron. When Co-Cr is sputtered on the Co-Cr-Nb(Ta) thin film, a crystal layer of fine grain of Co-Cr is essentially not formed at a boundary between Co-Cr and Co-Cr-Nb(Ta) because Co-Cr and Co-Cr-Nb(Ta) are similar both in composition and crystal structure. Even if the crystal layer of fine grain of Co-Cr should be formed at the boundary, it can be regarded that this crystal layer will not reach such a film thickness that would affect the perpendicular magnetic recording and reproducing characteristics. Hence, it can be regarded that a crystal layer 13 of coarse grain of Co-Cr is formed directly on the crystal layer 12 of fine grain of Co-Cr-Nb(Ta).

As described before, the crystal layer 13 has a high saturation magnetization Ms and also has a high coercivity Hc(⊥). Accordingly, when a perpendicular magnetic recording is performed with respect to a double film recording medium 14 by use of a ring core head 15, the lines of magnetic flux from the ring core head 15 penetrates the crystal layer 13 and reaches the crystal layer 12. It can be regarded that the lines of magnetic flux advance in the in-plane direction within the crystal layer 12 which is an isotropic low coercivity layer, and then advances perpendicularly toward the magnetic pole portion of the ring core head 15 via the crystal layer 13, to magnetize the crystal layer 13 in the perpendicular direction. Thus, a magnetic loop formed by the magnetic flux has a substantially U-shape as shown in FIG. 17. According to this perpendicular magnetic recording, a large remanent magnetization remains within the crystal layer 13 since the magnetic flux is concentrated at a predetermined position where the perpendicular magnetization is performed and perpendicularly penetrates the crystal layer 13 having the large saturation magnetization Ms.

Figure 18:
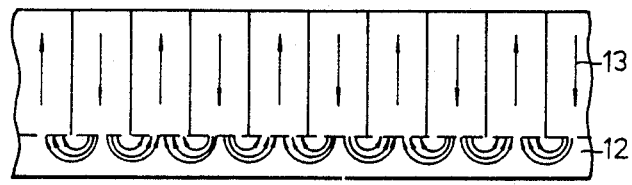
FIG. 18 is a diagram for explaining that lower portions of remanent magnetic fields in a crystal layer of coarse grain is linked via a crystal layer of fine grain.

When the perpendicular magnetic recording is performed with respect to the double film recording medium 14, a plurality of magnets having reversed magnetization direction in correspondence with a predetermined bit interval are alternately formed in the crystal layer 13 as shown in FIG. 18, wherein the arrows indicate the directions of the magnetization. Because the crystal layer 12 has a coercivity in the range of 10 to 220 Oe, a magnetic flux linking the lower portions of the mutually adjacent magnets is formed in the crystal layer 12 as indicated by the arrows in FIG. 18. Hence, there is no demagnetization phenomenon between the mutually adjacent magnets in the crystal layer 13 because the mutually adjacent magnets are magnetically coupled to each other, and this phenomenon is especially notable when the density between the mutually adjacent magnets is high. As a result, it is possible to obtain a high reproduced output.

On the other hand, it is possible to make the thickness of the recording medium 14 extremely small since the film thickness of the crystal layer 12 is in the order of 0.15 micron and extremely small. As a result, the resiliency of the magnetic layer of the recording medium is very satisfactory, and it is possible to realize a satisfactory contact between the ring core head 15 and the recording medium 14 (that is, the crystal layer 13).

Moreover, the sputtering time required to form the recording medium 14 is short because of the extremely small thickness of the recording medium 14, and the recording medium 14 can be manufactured with a high productivity and at a low cost.

In addition, since the coercivity Hc(∥) of the crystal layer 12 is not extremely small compared to the coercivity Hc(⊥) of the crystal layer 13, the Barkhausen noise will not be generated, and it is possible to perform satisfactory perpendicular magnetic recording and reproduction.

Further, the present invention is not limited to these embodiments, but various variations and modifications may be made without departing from the scope of the present invention.

What is claimed is:

1. A perpendicular magnetic recording medium on which a signal is recorded and from which the signal is reproduced by a magnetic head, said perpendicular magnetic recording medium comprising:
a recording medium base;
a lower layer formed on the recording medium base; and
an upper layer formed on the lower layer, said upper layer being made of cobalt-chromium,
said lower layer being formed of a sputtered magnetic material which includes cobalt, chromium and at least one of niobium in a range of 2 to 10 at% and tantalum in a range of 1 to 10 at% so that said lower layer has an in-plane coercivity in a range of 10 to 220 Oe said lower layer including a layer which is substantially magnetically-isotropic.

2. A perpendicular magnetic recording medium as claimed in claim 1 in which an in-plane squareness ratio of an in-plane M-H hysteresis characteristic of said upper and lower layers as a whole is 0.25 or less.

3. A perpendicular magnetic recording medium as claimed in claim 1 in which said lower layer has a thickness in a range of 0.05 to 0.15 micron.

* * * * *

UNITED STATES PATENT AND TRADEMARK OFFICE
CERTIFICATE OF CORRECTION

PATENT NO. : 4,792,486

DATED : December 20, 1988

INVENTOR(S) : Yasuo Ishizaka et al

It is certified that error appears in the above-identified patent and that said Letters Patent is hereby corrected as shown below:

ON TITLE PAGE:

At "[30]" insert:  ---Dec. 24, 1985  [JP]  Japan............ 60-291560---

At "OTHER PUBLICATIONS", at "VSM Profiling" (3rd entry), delete "pp. 814-814" and substitute therefor ---pp. 812-814---

Signed and Sealed this

Thirty-first Day of March, 1992

Attest:

HARRY F. MANBECK, JR.

*Attesting Officer*     Commissioner of Patents and Trademarks